United States Patent [19]

Ceriani

[11] Patent Number: 5,615,848

[45] Date of Patent: Apr. 1, 1997

[54] RESCUE AND AMBULANCE HELICOPTER

[75] Inventor: Mario Ceriani, New Town, Pa.

[73] Assignee: Agusta Eli S.r.l., Agusta, Italy

[21] Appl. No.: 363,155

[22] Filed: Dec. 23, 1994

[30] Foreign Application Priority Data

Dec. 23, 1993 [IT] Italy .................. TO93A0989

[51] Int. Cl.⁶ .......................... B64D 11/00; B64D 13/00
[52] U.S. Cl. ............................ 244/118.5; 244/118.6; 244/137.1; 244/137.2; 296/69; 296/65.1; 296/19; 297/67; 297/236
[58] Field of Search .................. 244/118.5, 118.6, 244/118.2, 137.1, 137.2; 296/69, 65.1, 19; 248/289.11; 5/626, 118, 133, 136; 297/14, 15, 67, 125, 378.13, 236

[56] References Cited

U.S. PATENT DOCUMENTS

| | | | |
|---|---|---|---|
| 281,410 | 7/1883 | Sleicher | 297/236 |
| 1,203,729 | 11/1916 | Hammers | 297/236 |
| 3,605,136 | 9/1971 | Vichness et al. | 296/19 |
| 3,811,138 | 5/1974 | Del Missier | 5/118 |
| 4,178,032 | 12/1979 | Hone | 244/118.1 |
| 4,210,355 | 6/1980 | Legueu | 296/19 |
| 4,626,018 | 12/1986 | Massey | 296/65.1 |
| 4,783,025 | 11/1988 | Moffett | 244/118.5 |
| 4,944,554 | 6/1990 | Gross et al. | |
| 5,120,103 | 6/1992 | Kave | 296/19 |

*Primary Examiner*—Andres Kashnikow
*Assistant Examiner*—Tien Dinh
*Attorney, Agent, or Firm*—Kane, Dalsimer, Sullivan, Kurucz, Levy, Eisele & Richard, LLP

[57] ABSTRACT

A helicopter presenting a passenger compartment defined longitudinally by two transverse walls and laterally by two swing-up doors; the passenger compartment being equipped for administering first aid and the conveyance of casualties, and presenting a support, adjacent to one of the transverse walls, for a first stretcher;

a main seat adjacent to the other transverse wall; a support, incorporated in the main seat, for a second stretcher; and two standby seats retractable inside the support of the first stretcher.

8 Claims, 4 Drawing Sheets

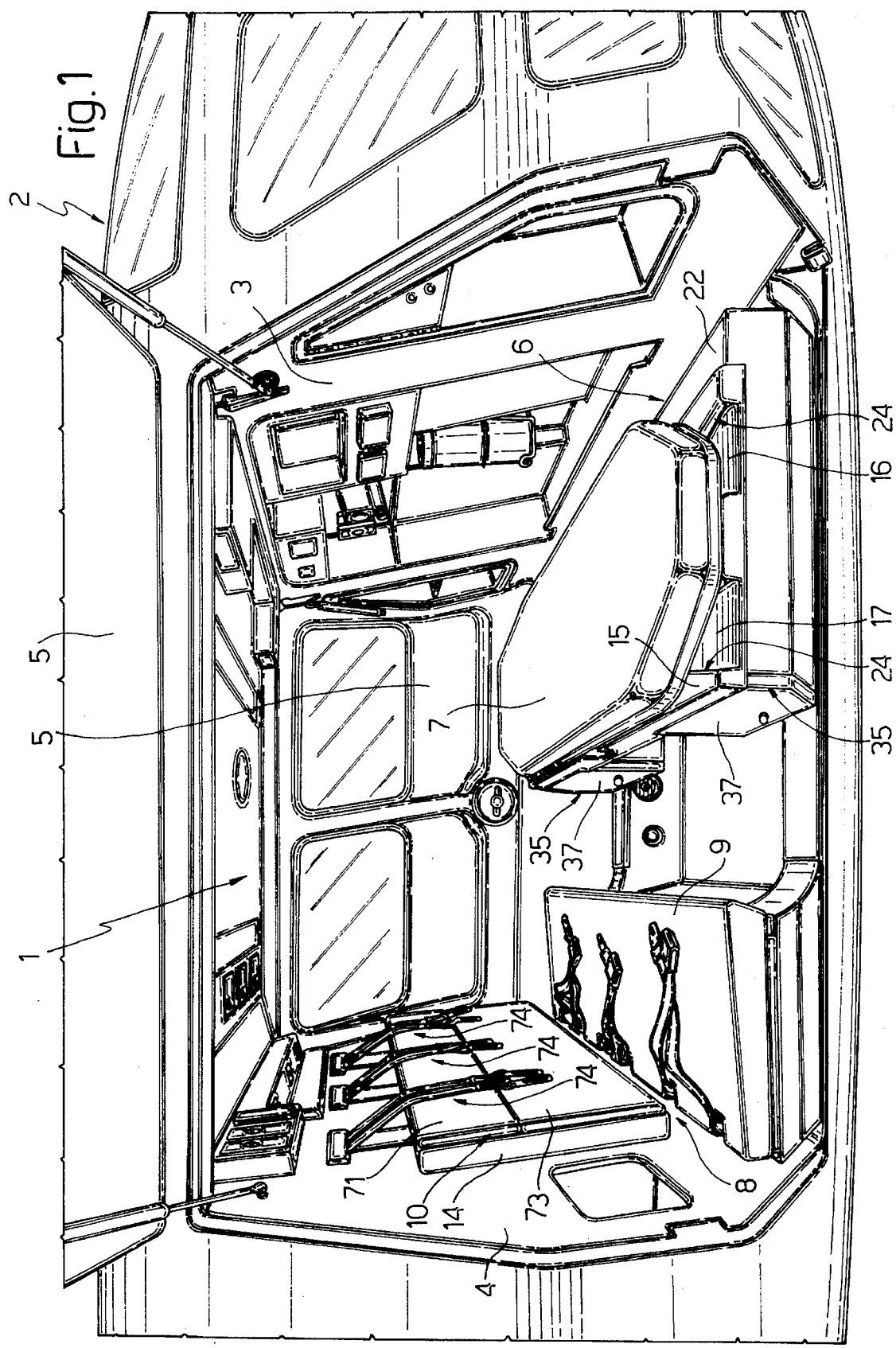

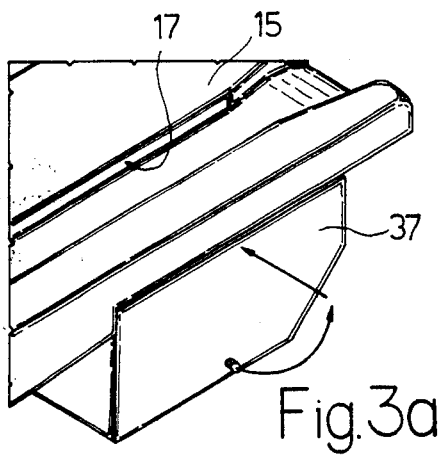
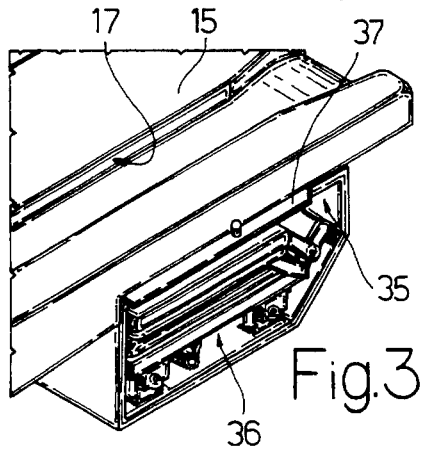
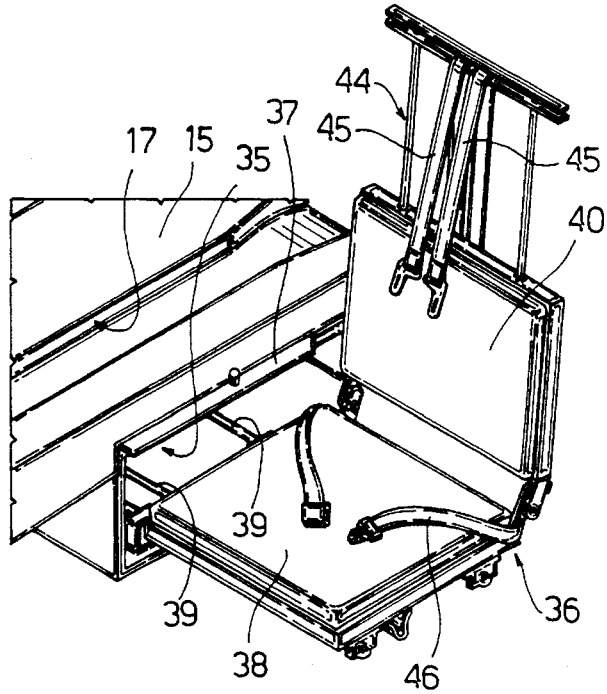
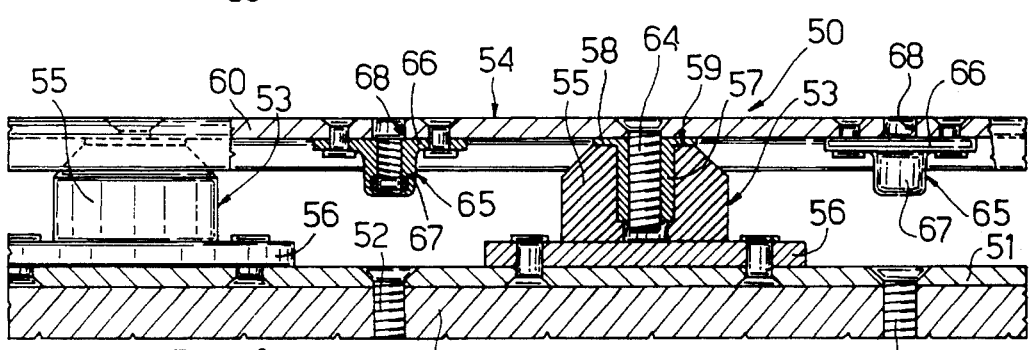
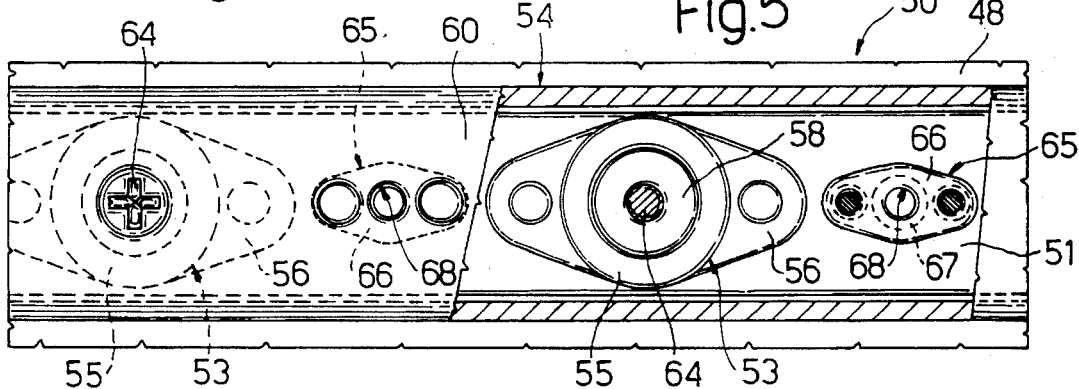

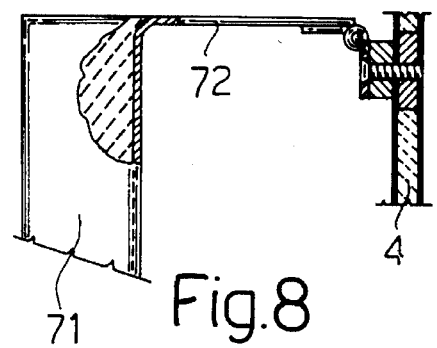
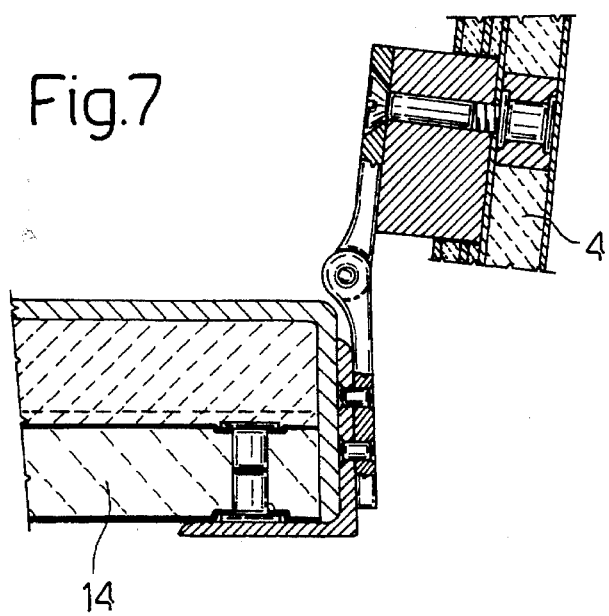
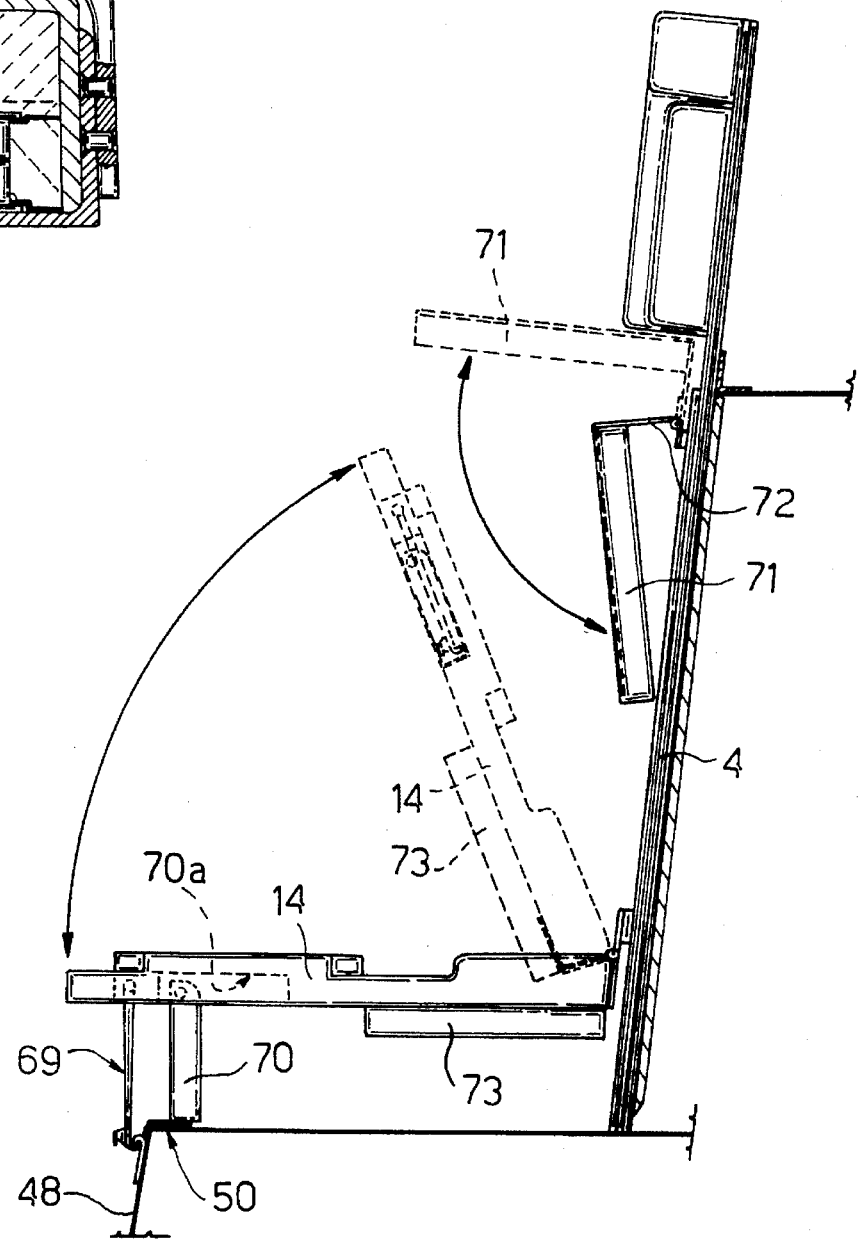

RESCUE AND AMBULANCE HELICOPTER

BACKGROUND OF THE INVENTION

The present invention relates to a helicopter, and more specifically to a rescue and ambulance helicopter.

SUMMARY OF THE INVENTION

It is an object of the present invention to provide a helicopter featuring a passenger compartment equipped for the aforementioned functions, and which presents a rational, efficient, compact arrangement of the equipment required for the conveyance of one or two casualties.

According to the present invention, there is provided a helicopter presenting a passenger compartment equipped for administering first aid and the conveyance of casualties and comprising at least one support for a first stretcher, and a main attendants' seat; characterized in that it comprises a support, incorporated in said main seat, for a second stretcher; and at least one retractable standby seat.

BRIEF DESCRIPTION OF THE DRAWINGS

A preferred, non-limiting embodiment of the present invention will be described by way of example with reference to the accompanying drawings, in which:

FIG. 1 shows a view in perspective of the passenger compartment of a helicopter in accordance with the teachings of the present invention;

FIG. 2b shows a section along line II—II in FIG. 2a;

FIGS. 3a, 3b, 3c show views in perspective of a retractable standby seat relative to the stretcher support in FIG. 2;

FIGS. 4 and 5 show a longitudinal section and top plan view respectively, with parts removed for clarity, of a vibration damping support for the main seat in FIG. 1;

FIG. 6 shows a schematic side view of the backrest of the main seat, and a second stretcher support incorporated in the backrest;

FIG. 7 shows a partially sectioned side view of the second stretcher support hinge;

FIG. 8 shows a partially sectioned side view of the main seat backrest cushion hinge.

DETAILED DESCRIPTION OF THE INVENTION

Figure 2A:
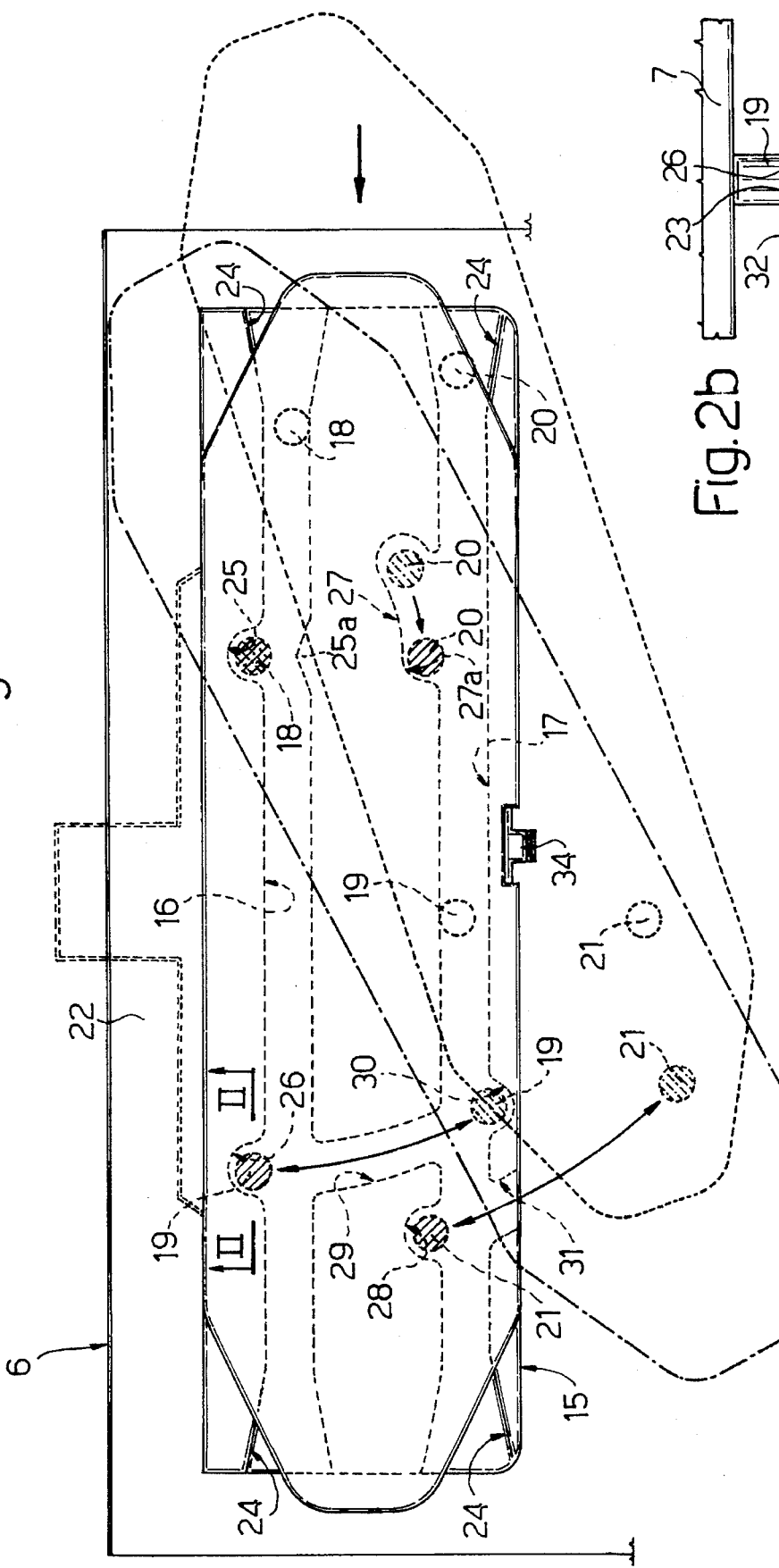
FIG. 2a shows a top plan view of the stretcher support and relative stretcher in various operating positions.
Figure 2B:
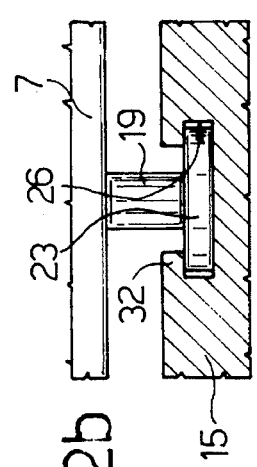

Number 1 in FIG. 1 indicates the passenger compartment of a rescue and ambulance helicopter 2 (shown partially).

Passenger compartment 1 is defined longitudinally by a front transverse wall 3 separating it from the cockpit (not shown), and by a rear transverse wall 4; and is defined laterally by two conveniently swing-up doors 5.

The equipment of passenger compartment 1 substantially comprises a support 6 for a first stretcher 7 and extending transversely in relation to helicopter 2 along front wall 3; a main attendants' seat 8 in turn comprising a seat portion 9 extending transversely in relation to helicopter 2 along rear wall 4, and a backrest 10 secured to wall 4; and a support 14, incorporated in backrest 10, for a second stretcher (not shown).

The above elements will now be described in more detail with reference to FIGS. 2a to 8.

Support 6 (FIGS. 1 and 2a) substantially comprises a bottom supporting structure 22 secured to the helicopter structure; and a surface 15 for supporting stretcher 7 and presenting a pair of parallel longitudinal rails 16, 17 for receiving respective feet 18, 19, 20, 21 of stretcher 7. Feet 18, 19, 20, 21 are substantially mushroom-shaped, each presenting a flared end 23 (FIG. 2b) for the purpose described later on.

Feet 18, 19 are located on the side of stretcher 7 facing wall 3, and present a smaller center distance than that between feet 20, 21; and feet 18 and 20 are aligned transversely with each other.

As shown in FIG. 2a, at each end, rails 16, 17 present flared lead-in portions 24 for assisting insertion of the feet of stretcher 7. Rail 16 is located adjacent to wall 3 of passenger compartment 1, and presents, on the side facing wall 3, a pair of semicircular seats 25, 26 with the same center distance as feet 18, 19, and, on the opposite side, a triangular projection 25a facing seat 25.

On the side facing rail 16, rail 17 presents a pair of seats 27, 28. Seat 27 comprises an end portion 27a aligned transversely with seat 25, and extends towards the nearest axial end of supporting surface 15 along an arc with its center at the axis of seat 25. Seat 28 is substantially semicircular, and the center distance between seat 28 and portion 27a of seat 27 is the same as that between feet 20 and 21.

Supporting surface 15 also presents a curved rail 29 intersecting rails 16 and 17, and extending, along an arc with its center at the axis of seat 25, from rail 16 at seat 26 to rail 17 at a seat 30 formed on the side of rail 17 facing away from rail 16.

Finally, supporting surface 15 also presents a passage 31 extending from rail 17 at seat 28 along an arc with its center at the axis of seat 25, and terminating on the side of surface 15 facing away from wall 3.

Seats 25, 26, 27, 28, 30 present respective inwardly-projecting top edges 32 (FIG. 2b) which cooperate with ends 23 for defining an axial stop for the feet of stretcher 7.

Support 6 also comprises a device 34 for locking stretcher 7 in the flight position, and by which the structure of the stretcher is clamped when the feet are engaged inside the respective seats as described later on.

Beneath supporting surface 15, at each end of support 6 of stretcher 7, there are formed two compartments 35 for housing respective retractable standby seats 36, one of which, together with respective compartment 35, is shown in various operating positions in FIGS. 3a, 3b, 3c and described below.

Compartment 35 presents a front hatch 37 which can be turned up and slid substantially entirely inside the top portion of compartment 35 (FIG. 3b).

Seat 36 comprises a seat portion 38 mounted in sliding manner on longitudinal guides 39 housed inside compartment 35; and a backrest 40 hinged to and foldable forward on to seat portion 38 which is movable between a retracted position inside compartment 35 (FIG. 3b), and an extracted position (FIG. 3c) enabling backrest 40 to be raised.

Backrest 40 comprises a top frame 44 which pulls out telescopically and is fitted with a pair of shoulder straps 45 cooperating with an abdominal seat belt 46 fitted to seat portion 38.

Number 50 in FIGS. 4 and 5 indicates a vibration damping support for connecting seat portion 9 of main seat 8 to structure 48 of helicopter 2.

Support 50 substantially comprises a flat strap 51 fitted to structure 48 of the helicopter by means of equally spaced screws 52; a number of damping elements 53, each fitted to strap 51 centrally between each pair of adjacent screws 52; and an upper channel section 54 fitted to damping elements 53 and fittable to the structure of seat portion 9.

More specifically, each damping element 53 comprises a substantially cylindrical, vertical block 55 of elastomeric material; and a metal bottom flange 56 integral with block 55 and riveted to strap 51. A threaded axial bush 57 is embedded inside block 55, and presents an annular end collar 58 cooperating with the top face 59 of block 55.

The inner face of the central portion 60 of channel section 54 rests on collars 58 of bushes 57, and channel section 54 is fitted to damping elements 53 by means of screws 64 screwed inside bushes 57.

Channel section 54, and more specifically the inner face of central portion 60, is fitted with a number of connecting elements 65 for connecting channel section 54 to the structure of seat portion 9.

Each connecting element 65 comprises an oblong flange 66 riveted to channel section 54; and a central threaded bush 67 located at a respective hole 68 in section 54, and inside which is screwed a respective screw for assembling the seat portion structure (not shown).

FIG. 6 shows the auxiliary stretcher support 14 incorporated in backrest 10 of main seat 8.

Support 14 substantially comprises a rigid surface conveniently made of synthetic composite material, and which is secured to rear wall 4 and normally constitutes the back of backrest 10. More specifically, support 14 is hinged along one side to wall 4 (FIG. 7), and is movable between a raised idle position (FIG. 1) wherein it rests against wall 4, and a lowered work position (FIG. 6) wherein it projects horizontally from wall 4. On the opposite side to that hinged to wall 4, support 14 presents feet 70 retractable inside respective seats 70a in support 14 (as shown by the dotted line in FIG. 6) and which rest on and are fittable to vibration damping support 50 when seat portion 9 is removed. Support 14 also presents a central front hook 69 for securing it to structure 48 of helicopter 2.

Backrest 10 of seat 8 comprises a top cushion 71 hinged along its top side to wall 4 by a rigid bracket 72 projecting from cushion 71 and detaching it from wall 4 (FIG. 8). Cushion 71 rests on top of support 14 when this is in the raised position; cushion 71 and support 14 conveniently present snap-on fastening means (not shown) for locking them in the aforementioned position; and cushion 71 can be turned up, as shown by the dotted line in FIG. 6, to turn down support 14.

Backrest 10 also comprises a bottom cushion 73 fitted to the portion of the face of support 14 left exposed by top cushion 71 and facing passenger compartment 1 when backrest 10 is in use.

Seat 8 is fitted with conventional seat belts 74 (FIG. 1).

In actual use, stretcher 7 may be loaded into the passenger compartment through either one of lateral doors 5. When loaded through the door to the right in FIG. 2a, stretcher 7 is conveniently loaded obliquely on to support 6, as shown by the dotted line, so that foot 18 engages rail 16, feet 19 and 20 engage rail 17, and, to assist the lead bearer, the leading end of the stretcher projects from support 6 towards the center of the passenger compartment.

The stretcher is then pushed along rails 16, 17.

Upon foot 18 contacting projection 25a, it slides obliquely along the inclined surface of the projection and engages seat 25 (position shown by the dot-and-dash line in FIG. 2a); foot 20 engages seat 27; and foot 19 is aligned with curved rail 29.

Stretcher 7 is then rotated about foot 18 to slide foot 19 along curved rail 29 into seat 26; during which rotation, foot 21 engages supporting surface 15 of stretcher 7 through passage 31 and engages seat 28, while foot 20 slides along seat 27 into end portion 27a.

Stretcher 7 is thus set in the flight position, in which it is locked by means of lock device 34.

Stretcher 7 is removed from support 6 by performing the above operations in reverse. In particular, when the stretcher is rotated from the flight position to the intermediate position shown by the dot-and-dash line, foot 19 engages seat 30 which acts as a stop for foot 19 and as a pivot about which to rotate stretcher 7 slightly (clockwise in FIG. 2a) to release foot 18 from seat 25 and prevent it from jamming against projection 25a.

Alternatively, stretcher 7 may be loaded on to support 6 through the opposite door 5, in which case, the most convenient method is to insert feet 18 and 20 inside respective rails 16 and 17, and slide the stretcher longitudinally and parallel to rails 16, 17 so that foot 18 is guided by projection 25a into seat 25 and the other feet into their respective seats.

When a second stretcher is needed, seat portion 9 of main seat 8 is removed; auxiliary stretcher support 14 is turned down as already described; and standby seats 36, which nevertheless provide for safe, comfortable seating of the attendants, are withdrawn to substitute for main seat 8.

The advantages of helicopter 2, and more specifically the design of passenger compartment 1, according to the present invention will be clear from the foregoing description.

In particular, the passenger compartment may be set up for conveying either one or two stretchers and for accommodating the attendants in both cases. In the single-stretcher configuration, the equipment relative to the two-stretcher configuration (auxiliary stretcher support and standby seats) are stowed away efficiently and compactly, thus providing for maximum space-saving and freedom of movement.

Moreover, the vibration damping supports of the main seat provide for drastically reducing the vibration generated by the rotor and transmitted by the helicopter structure to the main seat or second stretcher.

Clearly, changes may be made to the helicopter as described and illustrated herein without, however, departing from the scope of the present invention.

I claim:

1. A helicopter (2) presenting a passenger compartment (1) equipped for administering first aid and the conveyance of casualties and comprising at least one support (6) for a first stretcher (7), and a main attendants' seat (8); characterized in that it comprises a support (14), incorporated in said main seat (8), for a second stretcher; and at least one retractable standby seat (36); said passenger compartment (1) is defined longitudinally by two transverse walls (3, 4), and laterally by two swing-up doors (5); said support (6) for said first stretcher (7) and said main seat (8) being respectively adjacent to said transverse walls (3, 4).

2. A helicopter as claimed in claim 1, characterized in that said main seat (8) comprises a seat portion (9); and a backrest (10) secured to one (4) of said transverse walls; said support (14) for said second stretcher being incorporated in said backrest (10) of said main seat (8).

3. A helicopter as claimed in claim 2, characterized in that said support (14) for said second stretcher is hinged to said transverse wall (4) and movable between a raised idle position and a lowered position; said backrest (10) comprising at least one cushion (71) hinged to said transverse wall (4) over said support (14) for said second stretcher, and which is superimposed on at least a portion of said support (14) when said support (14) is in said raised position; said cushion (71) being liftable to enable said support (14) to be turned down.

4. A helicopter as claimed in claim 1,
characterized in that said standby seat (36) is housable inside a respective compartment (35) in said support (6) for said first stretcher (7).

5. A helicopter as claimed in claim 4, characterized in that it comprises two standby seats (36) housable in respective compartments (35) in and at opposite ends of said support (6) for said first stretcher (7).

6. A helicopter as claimed in claim 1, characterized in that said seat portion (9) of said main seat (8) is mounted on vibration damping support means (50).

7. A helicopter as claimed in claim 6, characterized in that said vibration damping support means (50) comprise a number of damping elements (53) made of elastomeric material and interposed between structural elements (51, 54) fitted respectively to the structure (48) of said helicopter (2) and to said seat portion (9).

8. A helicopter as claimed in claim 1, characterized in that said support (6) for said first stretcher (7) presents a number of longitudinal rails (16, 17); and said first stretcher (7) comprises a number of feet (18, 19, 20, 21) for engaging said rails (16, 17) in sliding manner; said stretcher (7) being loaded on to said support (6) in two different positions wherein at least one (19) of said feet engages two different rails (16, 17); said support (6) comprising at least one further rail (29) communicating with said longitudinal rails, and for permitting the passage of said foot (19) from one rail (17) to the other (16), and of said stretcher (7) from one position to the other.

* * * * *

UNITED STATES PATENT AND TRADEMARK OFFICE
CERTIFICATE OF CORRECTION

PATENT NO.   : 5,615,848
DATED        : April 1, 1997
INVENTOR(S)  : Mario Ceriani It is certified that error appears in the above-identified patent and that said Letters Patent is hereby corrected as shown below:

The title page item [73], assignee should read -- AGUSTA S.p.A.

Cascina Costa di Samarate --

Signed and Sealed this

Twentieth Day of January, 1998

Attest:

BRUCE LEHMAN

*Attesting Officer*    Commissioner of Patents and Trademarks